United States Patent [19]

Makita

[11] Patent Number: 4,503,486
[45] Date of Patent: Mar. 5, 1985

[54] SELF-LOCKING NUT FOR ADJUSTABLE HEADLAMP ASSEMBLY

[75] Inventor: Hiroyuki Makita, Shimizu, Japan

[73] Assignee: Koito Manufacturing Company Limited, Tokyo, Japan

[21] Appl. No.: 525,584

[22] Filed: Aug. 23, 1983

[30] Foreign Application Priority Data

Aug. 31, 1982 [JP] Japan ................. 57-132540

[51] Int. Cl.³ ............... B60Q 1/06; F16B 37/00
[52] U.S. Cl. .................. 362/61; 411/182;
411/427; 362/66; 362/284; 362/324; 362/419
[58] Field of Search ........... 362/324, 284, 289, 273,
362/275, 271, 420, 426, 425, 282, 66, 71, 61,
419, 83; 411/182, 172–173, 427, 174, 175, 537,
908

[56] References Cited

U.S. PATENT DOCUMENTS

| | | | |
|---|---|---|---|
| 2,836,214 | 5/1958 | Rapata | 411/182 |
| 2,875,804 | 3/1959 | Flora | 411/427 |
| 4,188,655 | 2/1980 | Tallon et al. | 362/289 X |

FOREIGN PATENT DOCUMENTS 56-44582 10/1981 Japan .

Primary Examiner—Richard E. Schafer
Assistant Examiner—John S. Maples
Attorney, Agent, or Firm—David A. Jackson; Daniel H. Bobis

[57] ABSTRACT

A lamp assembly for an automobile comprises a tilting member such as a lamp unit or reflector adapted to be moved by optical axis adjusting rods threadedly engaged with self-locking nuts relative to a support member such as a lamp unit casing or the like fixed to a vehicle body or the like so as to adjust an optical axis of the lamp unit or reflector. According to the invention, each self-locking nut is formed with two engaging grooves extending in directions perpendicular to each optical axis adjusting rod. One of the grooves has two opposite surfaces formed with round extensions extending toward each other. The other groove has a bottom having a convex along its generatrix.

10 Claims, 6 Drawing Figures

SELF-LOCKING NUT FOR ADJUSTABLE HEADLAMP ASSEMBLY

BACKGROUND OF THE INVENTION

1. Field of the Invention

This invention relates to an optical axis adjustable automobile lamp assembly, and more particularly to a lamp assembly for an automobile having a tilting member such as a lamp unit or reflector whose optical axis is adjustable by optical axis adjusting rods threadedly engaged with self-locking nuts relative to a support member such as a lamp unit or the like fixed to a vehicle body or a member thereon.

2. Description of the Prior Art

Automobile lamp assemblies such as automatic headlamps whose optical axes are adjustable relative to vehicle bodies are substantially classified into two types. One is the so-called reflector movable type whose optical axis is adjusted by moving a reflector as a tilting member relative to a lamp unit casing as a support member, while the other is the so-called lamp unit movable type whose optical axis is adjusted by moving a lamp unit as a tilting member comprising a reflector and a front lens relative to a support member such as a vehicle body or the like. In either type, there are commonly provided a plurality of optical axis adjusting rods and self-locking nuts threadedly engaged with the adjusting rods. Referring to FIG. 5 illustrating one example of the prior art reflector movable lamp, the same includes a lamp unit casing as a support member A fixed to a vehicle body or the like, a reflector as a tilting member B connected by a support leg rod 6 to the support member A, and self-locking nuts 2 secured to the tilting member B and threadedly engaged with optical axis adjusting rods 1 extending through the support member A from back side thereof. The optical axis adjusting rods 1 are threadedly operated so as to move the tilting member B relative to the support member A to adjust the optical axis of the lamp. On the other hand, with a lamp unit movable lamp as shown in FIG. 6, it includes a bracket as a support member fixed to a vehicle body or the like, and optical axis adjusting rods 1 extending through the bracket C and a support member R' of a lamp unit R as a tilting member and threadedly connected to self-locking nuts secured to the bracket C. The optical axis adjusting rods 1 are threadedly operated so as to move the lamp unit R as the tilting member relative to the bracket C as the support member on the side of the vehicle body to adjust the optical axis of the lamp.

With such conventional automobile lamp assemblies of these kinds, the self-locking nuts have been secured to the tilting or support members by caulking and press fitting to form unitary bodies unable to rotate relative to each other. In adjusting the optical axis, therefore, undue forces act on the mounting and supporting portions for the self-locking nuts, the threadedly engaged portions of the self-locking nuts with the optical axis adjusting rods, and the rotatably supporting portions for the optical axis adjusting rods (indicated by m and n in FIG. 5) because of somewhat rocking movement of the optical axis adjusting rods with the movements of the reflector or lamp unit in adjusting its optical axis. Accordingly, the optical axis adjusting operation cannot be smoothly effected and there is a risk of deformation or damage to the above portions subjected to the above undue forces and therefore to cause any deformation and play at these portions for a long period of use.

In order to solve these problems, an automobile headlamp assembly has been proposed. This headlamp assembly has self-locking nuts each formed with two engaging grooves extending in directions perpendicular to each optical axis adjusting nut so as to secure the self-locking nut to a tilting member or support member by means of the engaging grooves. Since, however, the two engaging grooves are made in the same configuration, the optical axis adjusting operation can be smoothly effected in the extending direction of the grooves (for example, for the horizontal optical axis adjustment), but cannot be sufficiently effected in the other directions (for example, for the vertical optical axis adjustment).

SUMMARY OF THE INVENTION

It is an object of the invention to provide an improved lamp assembly for an automobile, whose portions for securing and supporting self-locking nuts and portions of the nuts threadedly engaged with optical axis adjusting rods and rotatably supporting the rods are not subjected to any undue forces in adjusting an optical axis of the lamp assembly, so that the optical axis can be smoothly adjusted in horizontal and vertical directions without causing any deformation and play at the above portions for a long period of time.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENT

Figure 1:
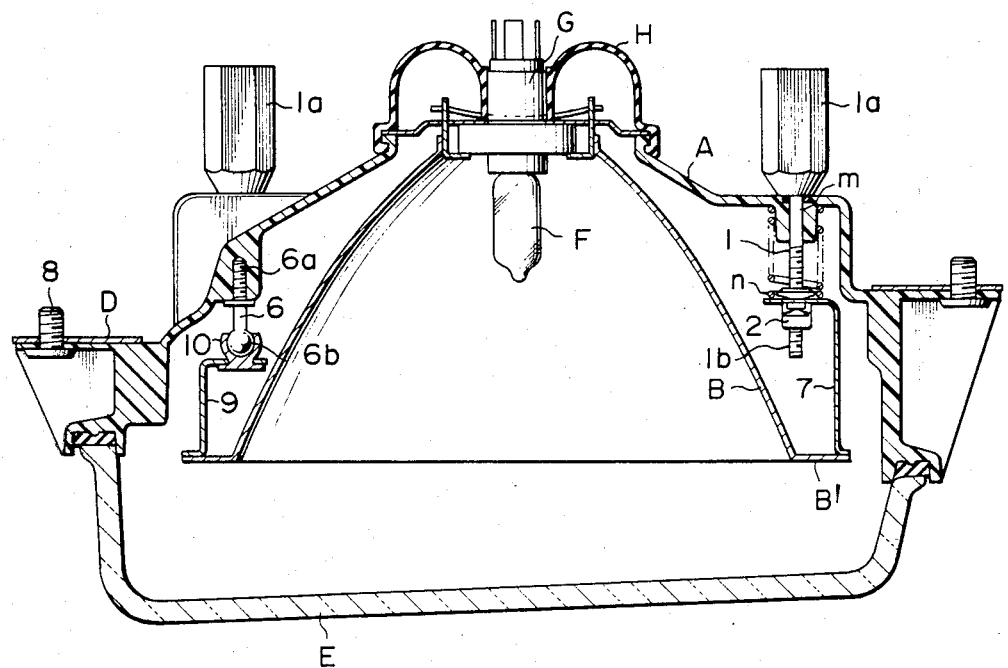
FIG. 1 is a sectional view of a reflector movable automobile headlamp according to the invention.

FIG. 1 is a reflector movable headlamp for an automobile of one embodiment of the invention. This headlamp comprises a support member A as a lamp unit casing, and a tilting member B as a reflector. The support member A is fixed to a vehicle body D by means of set screws 8 or the like and provided at its front end with a front lens E and encloses therein the reflector as the tilting member B and a light source bulb F supported by a bulb socket G for connecting the bulb to a power source. A waterproof cover H prevents rain water from undesirably flowing into the support member A.

The tilting member B as the reflector is secured to the support member A therein so as to permit an optical axis of the tilting member B to be adjusted with the aid of a support leg rod 6 adapted to be a fulcrum in adjusting the optical axis and a plurality of optical axis adjusting rods 1 adapted to be operating points. The support leg rod 6 is formed at its one end with screw threads 6a threadedly engaged in the support member A and formed at the other end with a spherical pivot 6b rotatably fitted in and connected to a spherical seat 10 secured to a bracket 9 of the tilting member B.

Each optical axis adjusting rod 1 is inserted into the support member A from its back side and rotatably supported thereat and is adjustable by an adjusting knob 1a secured to its backward extending end. Each optical axis adjusting rod 1 is further formed in the other end extending into the support member A with screw threads 1b adapted to be threadedly engaged in a self-locking nut 2 secured to a bracket 7 of the tilting member B. One of the two optical axis adjusting rods 1 is used for adjusting the optical axis in upward and downward directions and the other is used for adjusting the axis in horizontal directions. The two optical axis adjusting rods 1 and the above support leg rod 6 as the fulcrum are arranged such that lines connecting the two rods 1 and the support leg rod 6 constitute a triangle as viewed from a front side of the headlamp. The two optical axis adjusting rods 1 are threadedly operated to adjust the optical axis of the tilting member B through the self-locking nuts 2 or the bracket 7.

The construction of the self-locking nut 2 and its mounting structure will be explained hereinafter with reference to FIGS. 2 through 4.

The self-locking nut 2 is formed from a synthetic resin and consists of a head 21 substantially rectangular as seen in a plan view and extending mounting legs 22 integrally forked from the head 21. The self-locking nut 2 is further formed in the center of the head 21 with a threaded aperture 2a adapted to be threadedly fitted with the optical axis adjusting rod 1 extending between the mounting legs 22 and is formed on the outside of the mounting legs 22 with engaging grooves 4 and 5.

Figure 4:
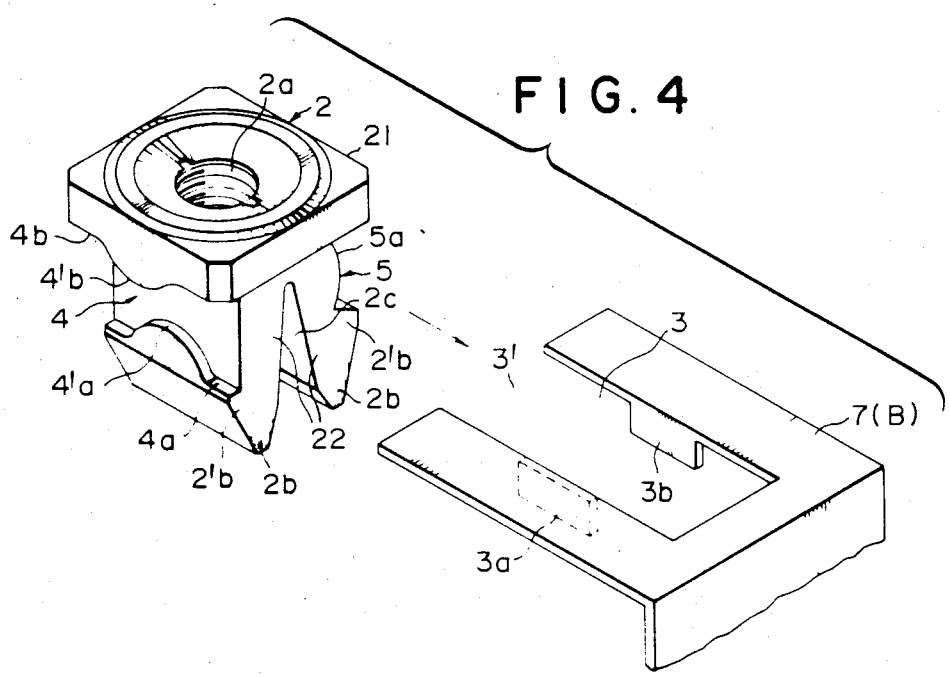
FIG. 4 is a exploded perspective view of the parts shown in FIGS. 2 and 3.
Figure 5:
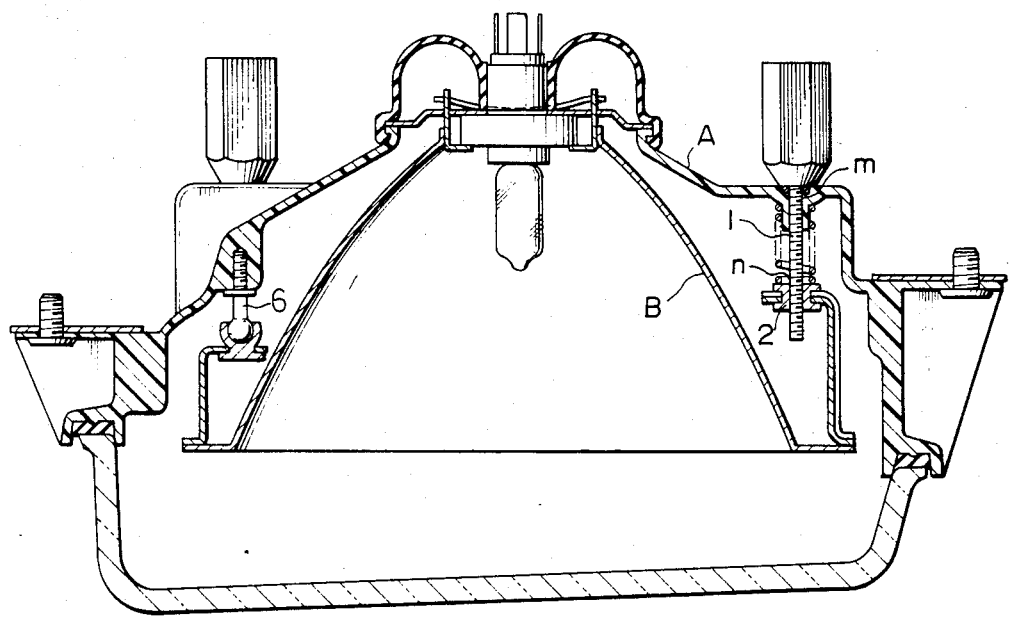
FIG. 5 is a sectional view of an example of a reflector movable automobile headlamp assembly of the prior art; and, FIG. 6 is a sectional view of an example of a lamp unit movable automobile headlamp assembly of the prior art.
Figure 6:
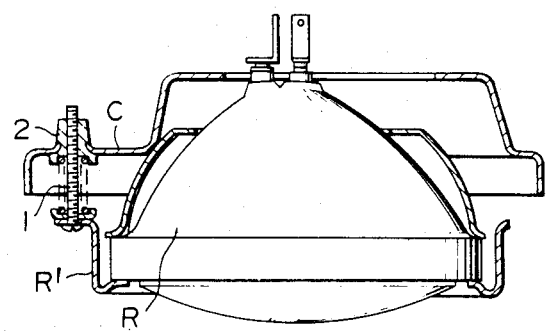

Each mounting leg 22 comprises an arrowhead portion 2'b outwardly extending from its distal end 2b, whose upper surface forms the groove 4 or 5 with a lower surface of the head 21 as viewed in FIG. 4.

The bracket 7 of the tilting member B is formed with an elongated mounting slot 3 having an opening end 3' for resiliently engaging with the grooves 4 and 5 to support the self-locking nut 2. If a thickness of the bracket 7 at the slot 3 is much thinner than widths $l_1$ of the grooves 4 and 5, the bracket 7 is formed with normally extending edge projections 3a and 3b corresponding to the grooves 4 and 5. Different from the mounting slot 3 shown in the drawing, it may be formed directly in a flange B' of the tilting member B or it may be a rectangular slot without any opening end.

The one engaging groove 4 of the self-locking nut 2 extends perpendicularly to the optical axis adjusting rod 1, and the opposite surfaces 4a and 4b forming the groove 4 are respectively formed at their center with round extensions 4'a and 4'b extending toward each other. The width $l_1$ of the engaging groove 4 is determined so as to permit the self-locking nut 2 to be freely rockable in an direction shown by an arrow $P_1$ in FIG. 2 (in optical axis adjusting operation for example in the vertical directions). Moreover, the minimum distance between the two extensions 4'a and 4'b is made substantially equal to the thickness of the bracket 7 at the mounting slot 3 (or the height $l_2$ including the edge projection 3a in case of thin bracket at the mounting slot). With this arrangement, the self-locking nut 2 is freely rockable in the direction shown by the arrow $P_1$ and is securely supported by the bracket without causing any deformation and play.

The other engaging groove 5 of the self-locking nut 2 extends perpendicularly to the optical axis adjusting rod 1 on the opposite side of the nut 2 to the engaging groove 4 but in parallel with and at the same level of the engaging groove 4. A bottom 5a of the groove 5 has a convex along its generatrix. The width $l_1$ of the engaging groove 5 is determined in the same manner as that for groove 4 such that the width $l_1$ is made wider than the thickness of the bracket 7 at the mounting slot 3 (or the height $l_2$ including the edge projection 3a in case of thin bracket at the mounting slot) so as to permit the self-locking nut 2 supported in the mounting slot 3 to be slidable in a direction shown by an arrow $P_2$ in FIG. 3, thereby enabling the self-locking nut 2 to be freely rockable in the direction shown by the arrow $P_3$ in FIG. 3 (in optical axis adjusting operation for example in the horizontal directions) and also in the direction shown by the arrow $P_1$ in FIG. 2 (for example in the vertical direction). As can be seen from the drawings, the direction shown by the arrow $P_3$ is at right angles to the direction shown by the arrow $P_1$, so that when the direction of the arrow $P_3$ is, for example, the horizontal adjusting direction of the optical axis, the direction of the arrow $P_1$ is the vertical adjusting direction of the optical axis.

In mounting the self-locking nut 2 into the mounting slot 3 of the bracket 7 of the tilting member B, the self-locking nut 2 is slid from the opening end 3' into the mounting slot 3 in a direction shown by an arrow in FIG. 4 to be engaged with and supported by the bracket 7, in case of the elongated slot 3 having the opening end 3' as shown in FIG. 4. If the mounting slot 3 is a rectangular slot without any opening end, the mounting legs 22 of the self-locking nut 2 are forced into the rectangular slot from the rear side of the lamp to be engaged and supported by the bracket 7. After the self-locking nut 2 has been mounted on the mounting slot 3 of the bracket 7, the optical axis adjusting rod 1 is threadedly inserted into the threaded aperture 2a of the nut 2 to somewhat expand the forked portion 2c of the two mounting legs 22 so as to be more rigidly resiliently supported by the bracket.

Figure 2:
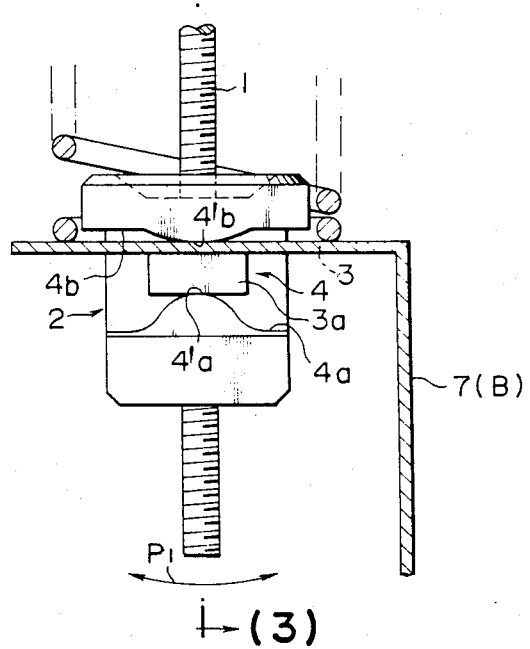
FIG. 2 is an enlarged and partially removed elevation of important parts of the headlamp shown in FIG. 1.
Figure 3:
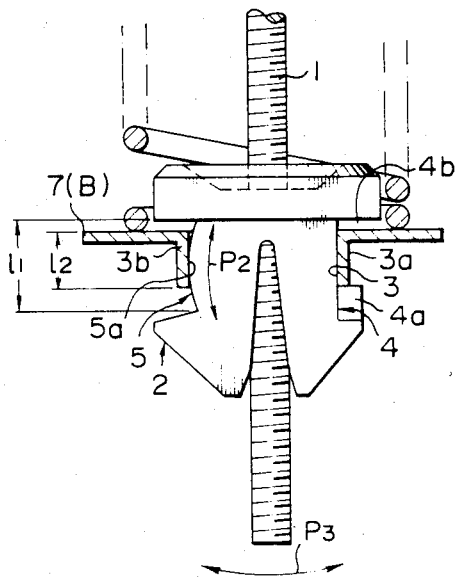
FIG. 3 is a sectional side view, partially removed of the parts taken along the line (3)—(3) in FIG. 2.

As can be seen from the above description, with the lamp for an automobile according to the invention, each self-locking nut 2 is freely rockable in the direction shown by the arrow $P_1$ in FIG. 2 about the extensions 4'a and 4'b of one engaging groove 4 for the vertical adjustment of the optical axis and also rockable in the direction shown by the arrow $P_3$ in FIG. 3 about the one engaging groove 4 for the horizontal adjustment of the optical axis. In adjusting the optical axis of a bulb, therefore, any undue force does not act on the mounting and supporting portion for the self-locking nut, the threaded portion of the nut with the optical axis adjusting rod and the rotatably supporting portion of the nut for the optical axis adjusting nut, so that the adjustment of the optical axis can be smoothly effected in vertical and horizontal adjusting operation without causing any deformation and play at the above portions for a long period of time.

While in the above description, the invention has been explained with the so-called reflector movable head lamp for an automobile, wherein a reflector as a tilting member is moved relative to a lamp unit casing as a support member to adjust an optical axis, it is to be understood that the invention is not limited thereto but may be varied within the scope of the invention. For example, the invention may be applied to a so-called lamp unit movable lamp wherein a tilting member which is a lamp unit comprising a reflector and a front lens is moved relative to a support member such as a vehicle body or a bracket fixed thereto to adjust an optical axis, without departing from the spirit and the scope of the invention.

I claim:

1. In a lamp assembly for an automobile including a support member formed with mounting slots, self-locking nuts respectively secured to said slots and supported by said support member, optical axis adjusting rods respectively threadedly connected to said self-locking nuts, and a tilting member connected to said optical axis adjusting rods and having an optical axis adjusted by said optical axis adjusting rods relative to said support member, the improvement comprising each said self-locking nut being formed with two engaging grooves in directions perpendicular to each said optical axis adjusting rod and engaged with each said mounting slot of said support member, one of said engaging grooves having two opposite surfaces formed with round extensions extending toward each other and the other of said engaging grooves having a bottom which is convex along its generatrix, said generatrix being located in a plane substantially perpendicular to the plane containing the arcs of said extensions.

2. A lamp assembly for an automobile as set forth in claim 1, wherein said tilting member is a lamp unit comprising a reflector and a front lens.

3. A lamp assembly for an automobile as set forth in claim 1, wherein said tilting member is a bracket supporting a lamp unit.

4. In a lamp assembly for an automobile with including a support member, a tilting member formed with mounting slots and secured to said support member, self-locking nuts respectively secured to said slots and supported by said tilting member, and optical axis adjusting rods respectively threadedly connected to said self-locking nuts and connected to said support member, said tilting member having an optical axis adjustable by said optical axis adjusting rods relative to said support member, the improvement comprising each said self-locking nut being formed with two engaging grooves extending in directions perpendicular to each said optical axis adjusting rod and engaged with each said mounting slot of said tilting member, one of said engaging grooves having two opposite surfaces formed with round extensions extending toward each other and the other of said engaging grooves having a bottom which is convex along its generatrix, said generatrix being located in a plane substantially perpendicular to the plane containing the arcs of said round extensions.

5. A lamp assembly for an automobile as set forth in claim 4, wherein said tilting member is a bracket supporting a reflector.

6. A lamp assembly for an automobile as set forth in claim 1 or 4, wherein said support member is a bracket.

7. A lamp assembly for an automobile as set forth in claim 1 or 4, wherein said support member is a lamp unit casing.

8. A lamp assembly for an automobile as set forth in claim 1 or 4, wherein said tilting member is a reflector.

9. An automobile having a vehicle body and a lamp assembly, said lamp assembly including a support member formed with mounting slots, self-locking nuts respectively secured to said slots and supported by said support member, optical axis adjusting rods respectively threadedly connected to said self-locking nuts, and a tilting member connected to said optical axis adjusting rods and having an optical axis adjusted by said optical axis adjusting rods relative to said support member, the improvement comprising each self-locking nut being formed with two engaging grooves extending in directions perpendicular to each said optical axis adjusting rod and engaged with each said mounting slot of said support member, one of said engaging grooves having two opposite surfaces formed with round extensions extending toward each other and the other of said engaging grooves having a bottom which is convex along its generatrix, said generatrix being located in a plane substantially perpendicular to the plane containing the arcs of said round extensions, and wherein said support member is said vehicle body.

10. An automobile having a vehicle body and a lamp assembly, said lamp assembly including a support member, a tilting member formed with mounting slots and secured to said support member, self-locking nuts respectively secured to said slots and supported by said tilting member, and optical axis adjusting rods respectively threadedly connected to said self-locking nuts and connected to said support member, said tilting member having an optical axis adjustable by said optical axis adjusting rods relative to said support member, the improvement comprising each said self-locking nut being formed with two engaging grooves extending in directions perpendicular to each said optical axis adjusting rod and engaged with each said mounting slot of said tilting member, one of said engaging grooves having two opposite surfaces formed with round extensions extending toward each other and the other of said engaging grooves having a bottom which is convex along its generatrix, said generatrix being located in a plane substantially perpendicular to the plane containing the arcs of said round extensions, and wherein said support member is said vehicle body.

* * * * *